Aug. 22, 1967    H. LEVIN    3,336,852

MAGNETICALLY ACTUATED SHUTTER

Filed July 7, 1965

Inventor:
Herman Levin
Barry L. Clark
By John E. Peele Jr.    Attys

United States Patent Office 3,336,852
Patented Aug. 22, 1967

3,336,852
MAGNETICALLY ACTUATED SHUTTER
Herman Levin, Glenview, Ill., assignor to Bell & Howell Company, Chicago, Ill., a corporation of Illinois
Filed July 7, 1965, Ser. No. 469,988
8 Claims. (Cl. 95—53)

The instant invention relates to shutters for optical instruments. Particularly the invention relates to a magnetically actuated shutter adapted for use with cameras and the like.

The operation of light shutters of optical instruments by forces obtained from an electro-magnetic field is well known in the art. The prior mechanisms employed for shutter operation fall into essentially several classes. One of these is characterized by constructions having shutter blades which are operated by a mechanical linkage, the mechanical linkage being magnetically or solenoid-actuated. Another of the prior classes is characterized by shutters having magnetic shutter leaves which are directly solenoid-operated. Still another prior class is characterized by devices having magnetic shutter blades which are moved between two or several magnetic poles as current supplied to the shutter blades is reversed. The shutters of each of the aforedescribed prior classes have inherent limitations arising from employment of mechanically operated shutter blades which are of rigid construction and pivoted for mechanical movement to control the size of light-passing apertures.

While the shortcomings and disadvantages of devices having parts associated together for mechanical movement are readily understood, frequently, in selecting a solution calculated to overcome such inherent shortcomings, potential problems relating to employment of such devices in outer space applications are overlooked. As a consequence, following solutions of problems, devices may be limited for use in a non-atmospheric or outer space environment.

To the end that a mechanical device may be used in a vacuous environment, operable components should be provided which obviate the requirement for conventional lubrication, inasmuch as conventional lubricants will evaporate in such environment. Furthermore, for applications in outer space it is preferred to minimize the number of components in, and size of, devices employed. Accordingly, if a function can be performed by other than mechanical means, the number of required components, as well as mechanism bulk, can be minimized. Additionally, by minimizing the number of mechanical components, cost of construction can be minimized proportionately.

As a feature of the instant invention there is provided a shutter construction for optical instruments which is devoid of mechanically movable components, whereby the construction is adapted for use under conditions in which an alternative to employment of a shutter having parts movable mechanically is desired.

Additionally, and as an object of the instant invention, there is provided an improved shutter for optical instruments which is electro-magnetically controlled.

A further object of the present invention is the provision of a shutter construction for optical devices defined by a resilient membrane having a light passage about which there are mounted magnetic members which are imbedded in the membrane, said magnetic members adapted to electro-magnetically control the passage size.

Another object of the instant invention is the provision of a shutter for an optical device and comprising a resilient membrane defining a normally closed light passage and having magnetic members mounted in said membrane about said passage with means for inducing a magnetic field about said magnetic members to repel the same to open the passage according to the level of magnetic energy developed in said magnetic fields.

Still a further object of the present invention is the provision of an electro-magnetic light shutter having magnetic members for controlling the size of the light passage and means for controlling the level of energy applied to said magnetic members to control the size of the light passage.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figure 1:
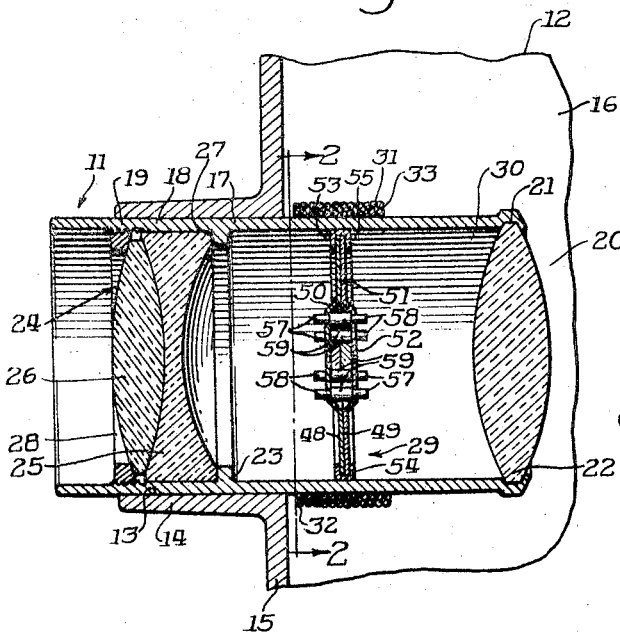
FIG. 1 is a diametric sectional view of a portion of a typical camera construction having a shutter embodying the present invention, the shutter being in closed position.

Now having reference more particularly to the drawings, there is shown partially an optical instrument, such as a camera, generally designated as 11 and the housing 12 of which is characterized by a bore 13 defined by an annular flange 14 which is concentric with the longitudinal axis of bore 13. From one end of the flange 14, a flat radial flange 15 projects outwardly to define a housing recess 16 which is co-extensive with the bore 13, as illustrated in FIG. 1. A lens barrel 17, which in the illustrated embodiment is in the form of a cylinder, has one portion 18 disposed within the bore 13 against the inner surface of the annular flange 14 with which said barrel 17 is shown concentric. The barrel 17 may be suitably fabricated from a material which will not block magnetic lines of force. The barrel 17 has what may be regarded as a front end portion 19 which is projected outwardly from the bore 13 into the recess 16.

The optical device herein selected for illustrating the present invention is a between lens shutter camera. It has a front focusing lens 20 which is mounted in the front end portion 19 of the barrel 17 as a result of engagement of the peripheral portion 22 of said lens 20 in a snap groove 21 provided at the forward end of said barrel 17. Within the lens barrel section 18, an inwardly extending shoulder 23 is generated which extends into bore 30 of lens barrel 17 and serves as an abutment for a lens cell generally designated 24. The cell 24 comprises a conventionally butted double concave lens 25 and a double convex lens 26, the forward end portion 27 of the concave lens being urged into engagement with the annular shoulder 23. In such engagement the butted together lenses 25 and 26 are secured and restrained from rearward movement by a retainer ring 28 which is threadingly mounted on the internal threads 69 of the tube section 18.

An electro-magnetically operated shutter construction generally designated 29 is mounted in fixed position within the bore 30 of the barrel 17, being disposed medially of lens 22 and the cell 24 in operable alignment therewith. A solenoid 31 is operably coiled about the lens barrel 17 in a manner such that the general plane of the shutter 29 is disposed substantially midway between the opposite end coils 32 and 33 of the solenoid.

Figure 2:
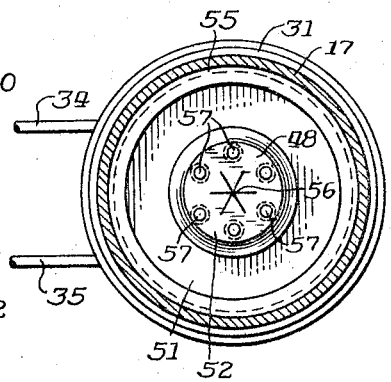
FIG. 2 is a sectional view taken substantially on the line 2—2 of FIG. 1 and looking in the direction of the arrows.
Figure 3:
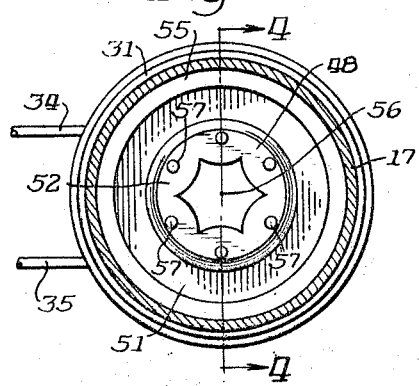
FIG. 3 is a view similar to FIG. 2, however showing the shutter in open position.
Figure 5:
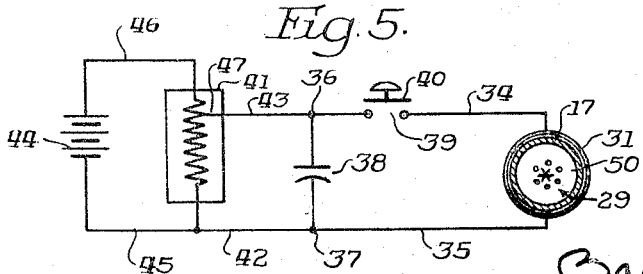
FIG. 5 is a schematic or diagrammatic representation of the wiring controlling the shutter.

As illustrated in FIGS. 2, 3 and 5, the opposite ends of the solenoid are co-extensive with a pair of leads or circuit means 34 and 35 which operably connect to the opposite terminals 36 and 37 of a capacitor 38 to which the solenoid 31 is thereby connected in series. The circuit means 34 has an opening at 39 between capacitor 38 and the solenoid 31, which opening is closable by a manually operable switch plate 40 which is normally biased to the open circuit position, as illustrated in FIG. 5. Upon closing of the switch 40, the capacitor 38 will release its energy to charge the solenoid 31 in a manner readily understood in the art.

To charge the capacitor 38, a variable resistance 41 is connected in series to the capacitor 38 by means of circuit wires 42 and 43, which, in the illustrated embodiment, are shown as connected at the terminals 36 and 37 heretofore defined. The source of power for the circuit is provided by a battery 44 the opposite terminals of which are connected to the opposite sides of the variable resistance 41 by means of circuit wires 45 and 46, as illustrated in FIG. 5. Not shown is a selector or indicator mounted adjacent a scale which may be carried on the external of the housing 12, the scale being calibrated according to the size of the shutter aperture which will be desired, and the unseen indicator being connected to the slidable variable resistance element 47 to move such element to a station in resistance 41 adapted to produce a voltage level corresponding to the size of aperture selected on the unshown calibrated scale.

Attention is now invited to the details of the shutter construction 29, which, as illustrated in FIGS. 1–4, inclusive, comprises a membrane 50 characterized, in the instant embodiment, by a pair of adjacent layers the rearward of which is identified by the numeral 48 and the forward of which is identified by the numeral 49. The membrane 50 may be considered as being disposed in a plane which extends transversely of the longitudinal axis of the lens barrel 17, and said membrane may be of generally circular outline, having an outer annular band 51 inwardly of which is a central part 52. The portions of the membrane layers 48 and 49 comprising the band 51 are disposed in engagement over their facing surfaces, and they have engaging annular rims 53 which are anchored in the annular channel 54 of a retainer ring 55. The outer surface of the ring 55 is rigidly connected to the inner annular surface of the barrel 17 by any suitable means to secure the shutter construction 29 transversely of the longitudinal axis of said lens barrel 17, as aforesaid.

The central part 52 of each of the layers 48 and 49 is of elastomer or rubber-like fabrication and is centrally apertured to provide a pair of aligned shutter openings defining a shutter light passage 56 disposed along the axis of the barrel 17. The nature or normal elastic characteristics of the central part 52 is such that the membrane 50 tends to collapse the light passage, as illustrated in FIGS. 1 and 2. That is to say, the arrangement or orientation of the molecules comprising the fabric of the membrane center part 52 normally holds the membrane closed about the light passage 56 to block the passage of light. By constructing membrane 50 double ply, blockage of light through the light passage 56 is insured should one of the apertures of the layers 49 and 50 leak light when it should not. That is to say, in the event the closure of the center part 52 of layer 49 were defective and permit some slight passage of light along an axis parallel to the center line of the barrel 17, such leakage would likely be blocked by the normal closure of the layer 48. Only in the unlikely event of simultaneous light leakage by both layers 49 and 50 along the same axis would there be any light leakage effect.

Figure 4:
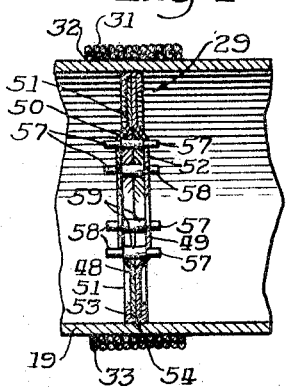
FIG. 4 is a sectional view taken substantially on the line 4—4 of FIG. 3 and looking in the direction of the arrows.

A plurality of slugs 57, not all of which have been numbered in FIGS. 2 and 3, and which are fabricated from magnetic material, are anchored in the membrane 50, said magnetic slugs being uniformly disposed in spaced apart circular or concentric relationship about the light passage 56. As illustrated in FIGS. 1 and 4, the slugs 57 are elongated axially of the barrel 17, and each defines a pair of opposite anchoring extensions 58 and a medial spacer portion 59. Only some of the extensions 58 and spacers 59 have been numbered in the drawings, to minimize crowding. The extensions 58 of each of the magnetic slugs 57 are projected outwardly from opposite sides of the layers 48 and 49. The spacers 59 are of greater diameter than said extensions 58 and serve to hold the layers 48 and 49 of the center diaphragm part 52 in spaced apart relationship, axially of barrel 17, as illustrated in FIGS. 1 and 4. As a consequence of the foregoing construction, the layers 48 and 49 are held spaced apart over an area from band 51 to the passage 56. Accordingly, each membrane is free normally to contract about its central aperture independently of the other.

The manner in which the construction operates is as follows: Upon closing of the switch plate 40, the potential of the capacitor is released to the solenoid 31. The level of energy in the solenoid will be dependent upon the voltage level of the capacitor prior to energy release. As previously indicated, the level of the capacitor voltage may be determined by the setting of an indicator along a calibrated scale (not shown) carried on the outside of the housing 12 for adjustment of the variable resistance element 47 to provide the desired voltage level in the capacitor. The current flow in the solenoid 31 will determine the extent to which the membrane will open about its light passage 56. That is to say, upon energizing of the solenoid 31 the magnetic slugs will become magnetized, the polarity of the induced magnetic fields being of repelling disposition, whereby said slugs 57 will be repelled from each other and move outwardly from the diaphragm center drawing the diaphragm from about the light passage 56. Because the strength of the repelling fields induced about the magnetic slugs 57 will be proportional to the current in the solenoid 31, the size to which light passage 56 will open will be determined by the level of the current discharged to the solenoid 31. Accordingly, the size of the shutter opening may be selectively controlled.

When the charge has dissipated, the induced magnetic fields will collapse and normal resilient properties of the membrane 50 will draw the shutter closed about the light passage 56.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A light shutter adapted for use in an optical instrument and the like and comprising
   a diaphragm defining a normally elastically closed light passage;
   magnetizable members mounted in said diaphragm about said light passage;
   a solenoid mounted about said diaphragm, and
   means connected to said solenoid for rapidly causing a current of short duration in said solenoid,
   the current being productive of a plurality of short-lived repelling magnetic fields to temporarily move said magnetizable members away from each other and thereby temporarily to draw the diaphragm to open the light passage.

2. The light shutter defined in claim 1 in which the light passage is centrally disposed in the diaphragm, and the magnetizable members are of uniform construction and disposed uniformly about the passage.

3. The light shutter defined in claim 2 in which the magnetizable members are elongated with their longitudinal axes disposed transversely of the diaphragm.

4. The light shutter defined in claim 1 in which the helical axis of the solenoid is disposed transversely of and concentric with said diaphragm and substantially equal lengths of said solenoid extend axially outwardly away from opposite diaphragm surfaces.

5. The light shutter defined in claim 1 in which the diaphragm comprises a pair of adjacent resilient layers having aligned independently normally closed passage defining apertures disposed centrally of said diaphragm.

6. The light shutter defined in claim 5 in which the adjacent layers have spaced apart center sections disposed equi-distant from opposite ends of the solenoid, and the magnetizable members are elongated and have medial spacer portions disposed between and opposite end portions extending through the spaced apart center sections, respectively.

7. The device defined in claim 1 in which the diaphragm comprises a pair of layers having central sections spaced apart axially of said solenoid and peripheral sections adjoining and concentric with said central sections, the magnetizable members being mounted in said central sections and having therebetween disposed medial spacer parts and therethrough projecting axial extensions, and an annular diaphragm retainer disposed within said tube and secured to said peripheral sections.

8. In an optical instrument and the like, the combination of a tube, a lens mounted in co-axial alignment with said tube, with
- a diaphragm of elastomer fabrication mounted in said tube and having a central normally elastically closed light passage disposed axially of said tube,
    - said diaphragm disposed in a plane extending transversely of said tube;
- a solenoid mounted about said tube and having opposed portions of equal length extending axially away from opposite sides of the plane of the diaphragm;
- a plurality of elongated uniform magnetic members mounted in said diaphragm and disposed concentrically with the light passage, and
- means connected to said solenoid for rapidly causing therein a current of short duration,
- the current being productive of a plurality of short-lived repelling magnetic fields to temporarily move said magnetic members radially away from said passage and thereby temporarily draw said diaphragm away from its center and open said passage.

References Cited
UNITED STATES PATENTS 1,934,519  11/1933  Anderson  95—53 X JOHN M. HORAN, *Primary Examiner.*